UNITED STATES PATENT OFFICE.

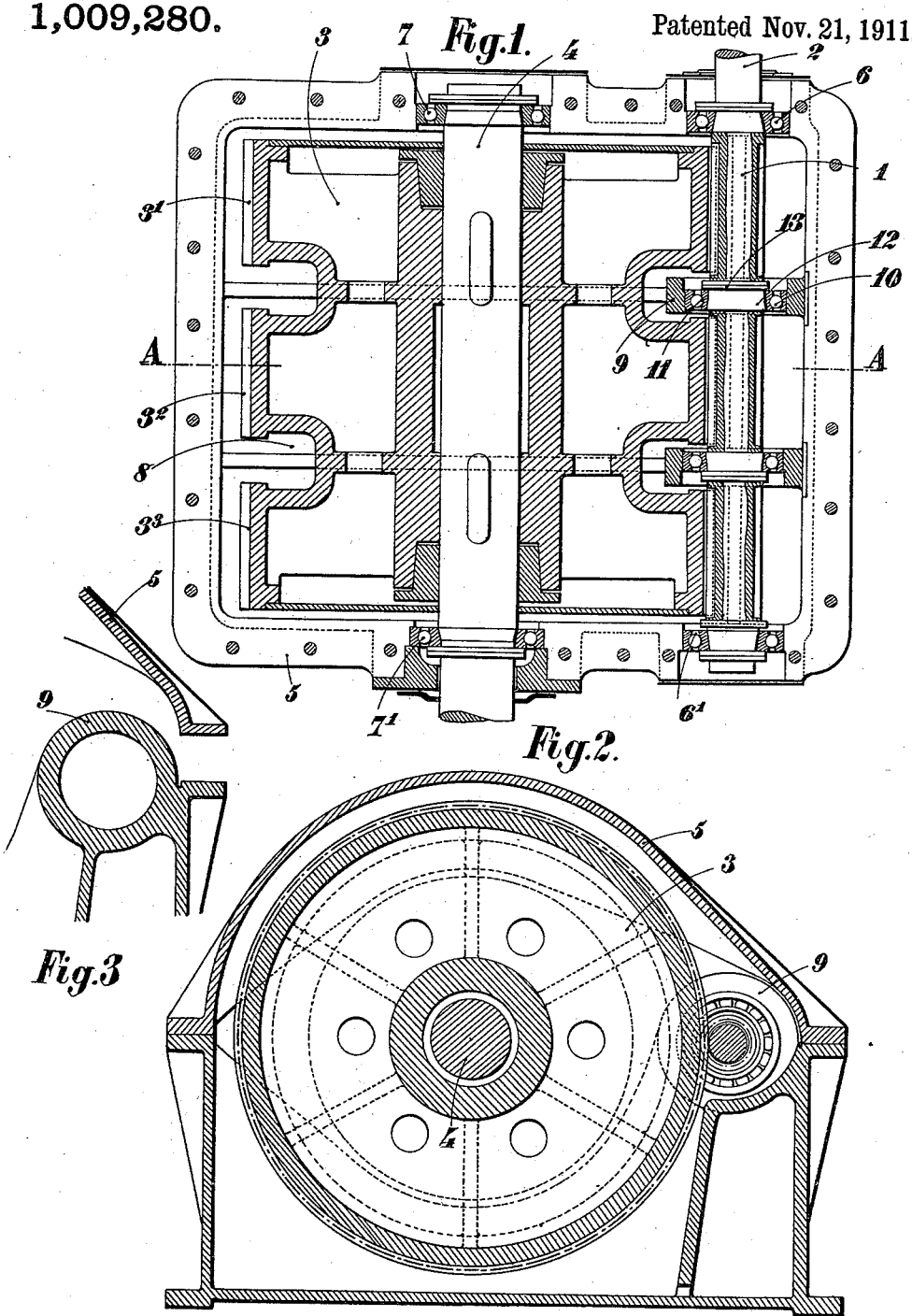

ANDRÉ CITROËN, OF PARIS, FRANCE, ASSIGNOR TO SOCIÉTÉ ANDRÉ CITROEN ET CIE., OF PARIS, FRANCE, A CORPORATION OF FRANCE.

SPEED-REDUCING APPARATUS.

1,009,280.  Specification of Letters Patent.  Patented Nov. 21, 1911.

Application filed May 10, 1911. Serial No. 626,277.

*To all whom it may concern:*

Be it known that I, ANDRÉ CITROËN, a citizen of the French Republic, residing at Paris, Department of the Seine, in France, have invented certain new and useful Improvements Relating to Speed - Reducing Apparatus, of which the following is a specification.

The invention has for its object to provide a speed reducing mechanism in which gearing is employed and is particuarly applicable to the transmission of high power and when one of the wheels or pinions rotates at a high rate of speed. When mechanism of this description is employed power is usually transmitted through gearing of considerable width, the diameter of the pinion being very small as compared with its width. The flexibility of the pinion therefore affects the satisfactory operation of the apparatus and reduces its efficiency.

The apparatus forming the subject matter of the present invention is characterized by a special construction of gearing which permits of supporting the long and flexible pinion in intermediate bearings as will be hereinafter explained.

In the accompanying drawings Figure 1 is a plan view of a speed reducing apparatus constructed in accordance with the invention, the upper portion of the casing being removed. Fig. 2 is a view in sectional elevation on the line A—A of Fig. 1; Fig. 3 being a detail view showing the arrangement of the intermediate bearings.

The speed reducing apparatus comprises a pinion 1 secured to or formed integral with a shaft 2 and a toothed wheel 3 which may be keyed or otherwise secured to a shaft 4. The pinion 1 and the wheel 3 are mounted in the interior of the casing 5 which is composed of two parts. The shafts 2 and 4 are mounted in ball races 6, $6^1$, 7, $7^1$, located in bearings formed at the joints of the casing.

The toothed wheel 3 is shown as comprising a number of sections $3^1$, $3^2$, $3^3$ carried by the same frame and separated by means of annular grooves 8. The grooves 8 permit the use of supporting rings or bearings 9 formed integral with the lower part of the casing 5. The bearings 9 serve to support the pinion 1 intermediate the outer bearings 6 and $6^1$ by means of ball races 10. The pinion 1 can therefore be considered as rotating about a rigid axis.

The assembling of the pinion 1 and of the wheel 3 in the interior of the casing is effected in the following manner. The pinion 1 is first placed in its bearings, the ball races 10 being passed over the ends of the shaft. The inner rings 11 of the ball races 10 which are slightly conical, are then forced on to the shoulder pieces 12 of the pinion 2 which are also conical, by means of nuts and lock nuts 13. The ball races 10 being secured to the pinion, they are placed in the bearings 9. The ball races 6 and $6^1$ are then mounted on the ends of the pinion 1. Finally the toothed wheel 3 is secured in its place. The upper portion of the casing is then placed in position on the lower portion and secured thereto by bolts or by other suitable means.

The ball races 6, $6^1$, 7, $7^1$ are held in the bearings in the outer casing and maintained in position thereby.

The pinion 1 and the wheel 3 are arranged to rotate in an oil bath. The internal diameter of the ball races 9 is slightly larger than the external diameter of the teeth of the pinion, so as to facilitate their being placed in position as above described. In the example shown the ball races are two in number and the diameter of the interior rings is the same, because these rings are threaded on to the shaft 1 from each side. But, in cases in which it is necessary to employ more than two intermediate bearings, the interior rings should have a greater internal diameter than that of the rings of the first ball races, so as to permit of their being placed in position on the pinion and secured in place after having traversed the shoulder pieces of the first ball races.

The interior rings of the ball races 6 and $6^1$ have a diameter which is slightly less than the external diameter of the teeth of the pinion, since they only have to support half the load in the intermediate ball races.

The use of ball races permits of considerably reducing the space occupied by the points of support for the pinion and, consequently, the size of the intermediate bearings. In this manner a very compact construction is obtained. The arrangement of the intermediate ball races in rings formed integral with the lower half of the casing dispenses with the necessity of constructing these rings or bearings in two pieces each attached to one half of the casing and rendering it a difficult matter to assemble the parts. The speed reducing apparatus can be used advantageously in every case where it is necessary to transmit relatively high power, for instance in the case where it is desired to transmit power from the shaft of a steam turbine to a shaft adapted to be driven at a lower speed.

I claim:

1. In gearing such as described, the combination of a relatively wide or elongated pinion, bearings for the same at and intermediate of its ends, and a toothed wheel meshing with said pinion, and practically coextensive in width with said pinion.

2. In gearing such as described, the combination of a relatively wide or elongated pinion, bearings for the same at and intermediate of its ends, and a toothed wheel meshing with the pinion and having a cut away or recessed portion to accommodate the intermediate bearing.

3. In gearing such as described, the combination of a relatively wide or elongated pinion, bearings at the ends of said pinion, intermediate bearings for said pinion, and a toothed wheel in mesh with said pinion over substantially the entire width of the same but having recessed portions to accommodate said intermediate bearings.

4. A device such as described comprising a casing made in separate sections, shafts having bearings at their ends between the casing sections, a pinion and gear wheel on the respective shafts within the casing, and an intermediate bearing for one of said last named parts, surrounding the shaft thereof at an intermediate point and secured to one of the casing sections.

5. In gearing such as described, the combination of a casing made up of upper and lower members, circular bearing members formed rigidly with one of said casing members, a pinion projecting through said bearing members, a gear wheel meshing with the pinion, shafts for the pinion and gear wheel respectively, and end bearings for said shafts interposed between the casing members.

In testimony whereof I have hereunto set my hand in presence of two subscribing witnesses.

ANDRÉ CITROËN.

Witnesses:
H. C. COXE,
EMILE KLOTZ.

---

Copies of this patent may be obtained for five cents each, by addressing the "Commissioner of Patents, Washington, D. C."